US008337757B2

(12) United States Patent
Roychoudhury et al.

(10) Patent No.: US 8,337,757 B2
(45) Date of Patent: Dec. 25, 2012

(54) REACTOR CONTROL METHOD

(75) Inventors: Subir Roychoudhury, Madison, CT (US); Joel M. Desjardins, Vernon, CT (US); David Spence, Beacon Falls, CT (US); Richard Mastanduno, Milford, CT (US); Dennis E. Walsh, Richboro, PA (US); William C. Pfefferle, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 455 days.

(21) Appl. No.: 12/322,970

(22) Filed: Feb. 9, 2009

(65) Prior Publication Data
US 2009/0228146 A1 Sep. 10, 2009

Related U.S. Application Data

(60) Provisional application No. 61/063,952, filed on Feb. 7, 2008.

(51) Int. Cl.
*G05B 13/00* (2006.01)
(52) U.S. Cl. ........ 422/111; 422/105; 422/177; 422/180; 422/78; 422/182; 422/183; 422/204; 422/643; 422/223; 700/266; 700/274; 436/159; 436/160; 436/136; 436/143
(58) Field of Classification Search .................. 700/266, 700/274; 422/177, 180, 78, 182, 183, 204, 422/643, 223, 105, 111; 436/159, 160, 136, 436/143
See application file for complete search history.

(56) References Cited

U.S. PATENT DOCUMENTS

| 5,596,514 | A | 1/1997 | Maher, Jr. |
|---|---|---|---|
| 6,284,398 | B1 | 9/2001 | Kiryu |
| 6,783,742 | B2 | 8/2004 | Bentley |
| 6,869,456 | B2 | 3/2005 | Salemi |
| 6,887,436 | B1 | 5/2005 | Fisher |
| 7,156,886 | B2 | 1/2007 | Nakamura |
| 2005/0028445 | A1 | 2/2005 | Roychoudhury |
| 2005/0267606 | A1 | 12/2005 | Bartlett, Jr. |
| 2006/0179717 | A1 | 8/2006 | LaBarge |
| 2007/0084118 | A1 | 4/2007 | Kaeding |

(Continued)

FOREIGN PATENT DOCUMENTS

DE 19930051 C2 1/2001

(Continued)

OTHER PUBLICATIONS

In-Kyung Sung, Christian, Michael Mitchell, Dong-Pyo Kim, and Paul J. A. Kenis, "Tailored Macroporous SiCN and SiC Structures for High-Temperature Fuel Reforming," Advanced Functional Materials, Wiley-VCH Verlag GmbH & Co., 2005, 1336-1342.

(Continued)

*Primary Examiner* — Jill Warden
*Assistant Examiner* — Shogo Sasaki
(74) *Attorney, Agent, or Firm* — Robert L. Rispoli

(57) ABSTRACT

A method is provided for controlling the operating temperature of a catalytic reactor using a closed-loop system that provides for varying the reactor input and other operating parameters in order to maintain the operating temperature of the reactor at or near the initial setpoint temperature for operation of the reactor. In one example, maximum and minimum operating temperatures with a catalytic partial oxidation reactor are controlled, as well as maintaining control over the corresponding minimum required ratio of oxygen atoms to carbon atoms, such that the operating temperature within the reactor is maintained below the material limits but above threshold temperatures for coking.

12 Claims, 2 Drawing Sheets

U.S. PATENT DOCUMENTS

| | | |
|---|---|---|
| 2007/0151154 A1 | 7/2007 | Lyubovsky |
| 2008/0020336 A1 | 1/2008 | Kaeding |
| 2008/0169449 A1 | 7/2008 | Mundschau |
| 2009/0252661 A1 | 10/2009 | Roychoudhury |

FOREIGN PATENT DOCUMENTS

| | | |
|---|---|---|
| DE | 10 2004 049903 B4 | 4/2006 |
| WO | WO 2004060546 A1 | 7/2004 |

OTHER PUBLICATIONS

Copending U.S. Appl. No. 12/080,919, entitled "Fuel Reformer," filed Apr. 7, 2008, in the name of Subir Roychoudhury, et al., published as US-2009-0252661-A1 on Oct. 8, 2009.

Copending U.S. Appl. No. 12/460,543, entitled "Reactor Flow Control Apparatus," filed Jul. 21, 2009, in the name of Subir Roychoudhury, et al.

REACTOR CONTROL METHOD

CROSS-REFERENCE

This application claims the benefit of U.S. Provisional Application No. 61/063,952 filed Feb. 7, 2008.

FIELD OF THE INVENTION

The present invention relates to a method for controlling the operating temperature of a catalytic reactor. While this is applicable to different types of catalytic reforming reactors, it is described here with reference to a Catalytic Partial Oxidation Reactor since the constraints of high temperature and coking are most acute. The present invention provides a method for protecting the catalyst from temperature excursions, minimizing coking, compensating for suboptimal mixing at the feed, recovering from operation under coking regimes, and providing for a much longer run-time duration at maximum operating temperature, and periodically or actively maintaining the minimum operating temperature.

BACKGROUND OF THE INVENTION

Brief Description of the Related Art

There are many methods known in the art for controlling the operating temperature of a chemical reactor. Closed-loop systems are among these known methods. Typically, a controller is employed such that one or more output variables of a system are tracked against a certain reference points over time. The controller varies the inputs to a system to obtain the desired effect on the output of the system thereby maintaining the output variables at or near the reference points. Accordingly, a closed-loop system for controlling the operating temperature of a chemical reactor would monitor the reactant products or other operating parameters such as operating temperatures, track the measurements and compare such values to a desired reference. The system would provide for varying the reactor input and other operating parameters in order to maintain the operating temperature of the reactor at or near a reference point or reactor temperature setpoint.

Waterless catalytic partial oxidation (hereinafter referred to as "CPOx") of liquid distillate fuels, such as, for example, diesel and JP8, with near complete conversion to Carbon ($C_1$) products is a challenging proposition. The general reaction is shown below:

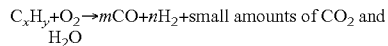

$$C_xH_y + O_2 \rightarrow mCO + nH_2 + \text{small amounts of } CO_2 \text{ and } H_2O$$

The practical ability to operate in this mode requires a reactor design that provides high selectivity to the partial oxidation products CO and $H_2$ compared to the complete oxidation products $CO_2$ and $H_2O$. While some studies have described CPOx of diesel, typically these have not been operated in "dry" mode (i.e., the reactions have been performed by adding some steam from an external source, or by partially burning some of the hydrocarbon feed to generate water in-situ, and/or by using an upstream process to remove the heavier ends from the fuel).

Moreover, CPOx of distillate fuel is made difficult due to carbon formation and/or excessively high reactor temperatures. In the present invention, in conjunction with reactor design, unique control algorithms permit operational precision that addresses the constraints of dry CPOx. Thermodynamic considerations of dry CPOx, as well as the hurdles and design requirements identified to develop a dry CPOx reactor, also must be considered and explained here.

Due to the thermodynamic drive for coke formation, which can be exacerbated by inherent non-uniformities in the feed to a CPOx reactor, there is a need to diminish this coke formation and the subsequent catalyst temperature spread resulting from increasing flow disparities that arise. By limiting fuel flow over a certain span, the maximum operating temperature of a reactor can serve as a measured process variable and subsequently controlled in closed-loop fashion. However, under coking and/or suboptimal mixing/fuel-atomization/vaporization conditions, having a maximum operating temperature within the reactor (hereinafter "Tmax") set such that the minimum operating temperature within the reactor (hereinafter, "Tmin") is above the thermodynamic threshold for coking will only be useful for a short time; inherent cold zones may develop, dropping the Tmin even though Tmax is held constant. In this case, attempting to increase Tmin at point in the reactor by adjusting the fuel input would have the undesirable effect of increasing Tmax at another point in the reactor. Therefore, a periodic need for a second closed-loop system controlling air or other means to increase the Tmin is desirable.

It is an object of the present invention to provide a method for controlling the operating temperature of a reactor using a closed-loop system that provides for varying the reactor input and other operating parameters in order to maintain the operating temperature of the reactor at or near the initial setpoint temperature for operation of the reactor. It is another object of the present invention to provide a method for controlling the operating temperature of a reactor using a closed-loop system that provides for controlling the operating temperature of a CPOx reactor which maintains temperatures within the catalytic reactor below material limits but above threshold temperatures for coking.

DESCRIPTION OF THE INVENTION

A reforming reactor was tested for the dry reforming of distillate fuels. It was based on a small, modular catalytic reactor, which employed patented Microlith® substrate and catalyst technology available from Precision Combustion, Inc. in North Haven, Conn. High conversion of the diesel feed was observed with high selectivity of the hydrogen in the fuel converted to $H_2$. A control algorithm was developed for stable long-term operation.

DETAILED DESCRIPTION OF THE INVENTION

Figure 1:
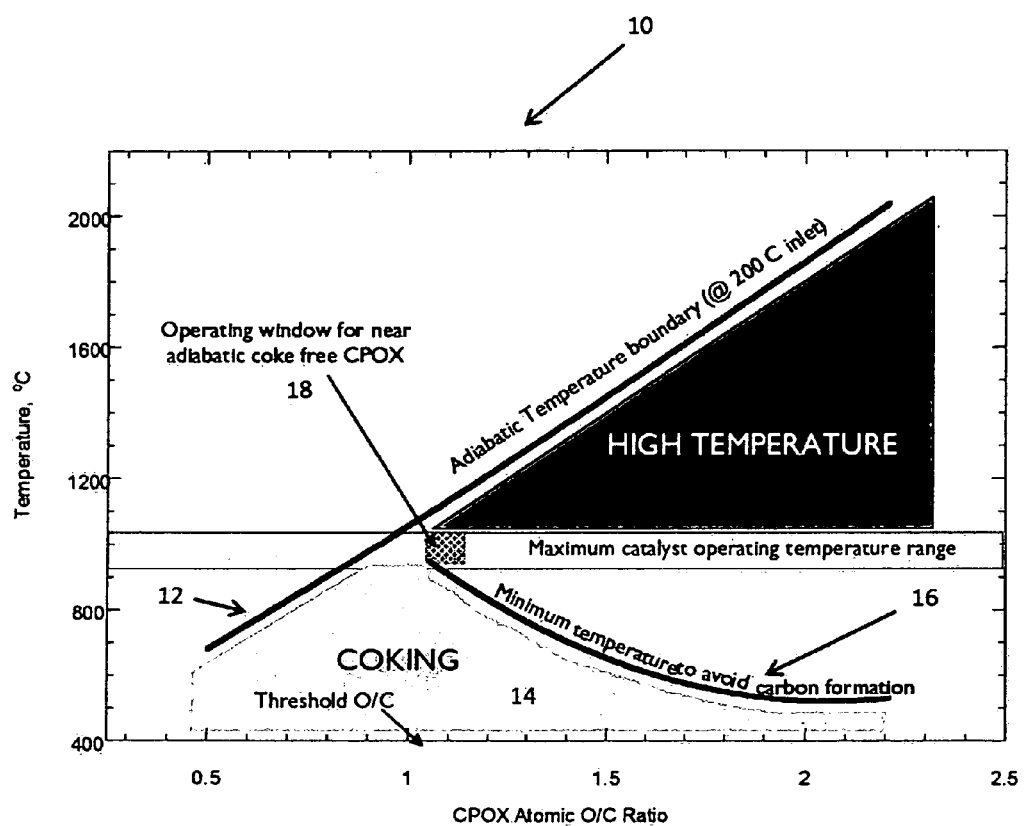
FIG. 1 provides a graphical depiction of coking and high temperature regions associated with CPOx of liquid distillate fuels and an illustration of the desired operating region in accordance with the present invention.

FIG. 1 below presents a graphical depiction (10) of the results of thermodynamic calculations at ambient pressure defining the boundaries between the regions associated with reactor temperature and coking constraints. In these calculations, hydrocarbon distillate boiling range fuels were represented by a surrogate blend of model compounds. In all cases, hydrocarbon conversion at equilibrium was complete.

CPOx operation occurs to the right of the line (12) defining the adiabatic temperature boundary. The coking region (14) is defined by the area below the adiabatic temperature line (12) and its intersection with the curve (16) defining the relationship between CPOx operating temperature and the corresponding minimum required ratio of oxygen atoms to carbon atoms (hereinafter referred to as the "O/C Ratio") to avoid carbon formation.

FIG. 1 indicates that higher temperatures ease the problem of carbon formation. The required feed O/C Ratio diminishes significantly as the practical limit on operating temperature for catalytic processing is reached. The adiabatic temperatures associated with higher O/C Ratios can substantially exceed the maximum acceptable limit for catalytic operation and material durability. Therefore, FIG. 1 implies that operating at unduly high O/C Ratios to avoid carbon formation would lead to increasing reactor heat duties.

When operating in the coke-free region at or below the maximum operating temperature range, the higher the O/C Ratio, the lower the selectivity to $H_2$ and CO. Thus, it is desirable to operate at the lowest O/C Ratio consistent with the avoidance of carbon formation while achieving acceptable CPOx product selectivities. As the temperature increases and the required O/C Ratio declines, the adiabatic temperature rise likewise diminishes. Table 1 below illustrates some of the sensitivities of carbon formation to small variations in operating conditions.

TABLE 1

Calculated Dry CPOx Performance Variations Near the Carbon Formation Boundary

| O/C Ratio | Tin, ° C. | Adiabatic Temp., ° C. | Carbon Formation, wt. % Hydrocarbon Feed |
|---|---|---|---|
| Base | Base | Base | 0.0 |
| 95% Base | Base | Base − 65 | 0.55 |
| 95% Base | Base + 100 | Base + 11 | 0.22 |
| 95% Base | Base + 150 | Base + 52 | 0.14 |
| 95% Base | Base + 200 | Base + 94 | 0.09 |

A relatively small decrease in the O/C Ratio at a fixed inlet temperature results in the onset of carbon formation with a 65° C. lower adiabatic temperature. Progressive increases in the inlet temperature at the decreased O/C Ratio level boost the adiabatic temperature back to, and beyond, the base level calculated; however, while progressively reducing the calculated equilibrium carbon level, the increases do not completely eliminate it even at adiabatic temperatures exceeding the expected maximum allowable operating level. This indicates the importance of maintaining the proper minimum O/C Ratio if even small amounts of carbon formation cannot be tolerated. Thus, dry CPOx involves a balance between avoiding coke formation by managing the O/C Ratio while ensuring that acceptable temperatures are maintained to avoid exceeding any material's limitations and/or a decline in product selectivity.

This balance is indicated by the Operating Window for Near Adiabatic CPOx (18) depicted in FIG. 1. These thermodynamic calculations provide useful directional guidance. Actual experimental observations, however, will depend upon such things as coke formation kinetics and experimental non-idealities.

In one embodiment of the present invention, fuel was pressurized by a fuel pump and metered through a fuel gauge. A fuel-air mixture was passed to the catalytic reactor using a spray nozzle. Compressed air was supplied to the system and was metered by mass flow controllers. Ambient air without external pre-heating was used. Water flow (when employed for other reforming reactions) was metered by a calibrated piston pump and was passed through an electrically heated vaporizer prior to mixing with the air stream. The fuel/air (and steam when applicable) mixture entered the catalyst bed where the reforming reaction occurred producing $H_2$ and CO. Peak reactor temperatures were maintained below the catalyst and substrate material limits. Reforming was performed using a catalytic reactor comprising the wire mesh-based substrate Microlith® coated with a selective Rh supported on alumina washcoat formulation. The decision to augment dry reforming with some steam addition is dependent upon the interplay between the desire to reduce the hydrocarbon feed rate and any application-specific constraints. As noted above, the use of some steam may also be desirable for moderating any coke formation under reforming conditions.

Figure 2:
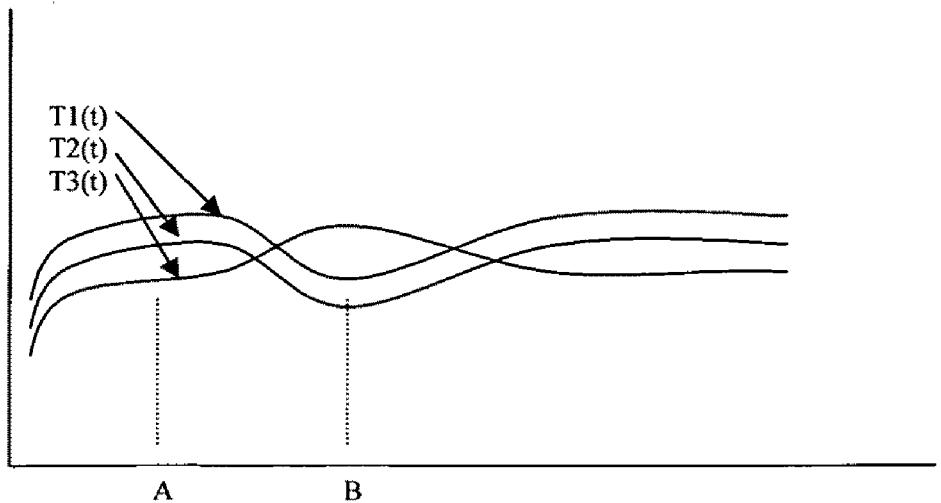
FIGS. 2 and 3 provide a graphical depiction of reactor operating temperature trigger points for intervention by a closed-loop system controller in accordance with the present invention.
Figure 3:
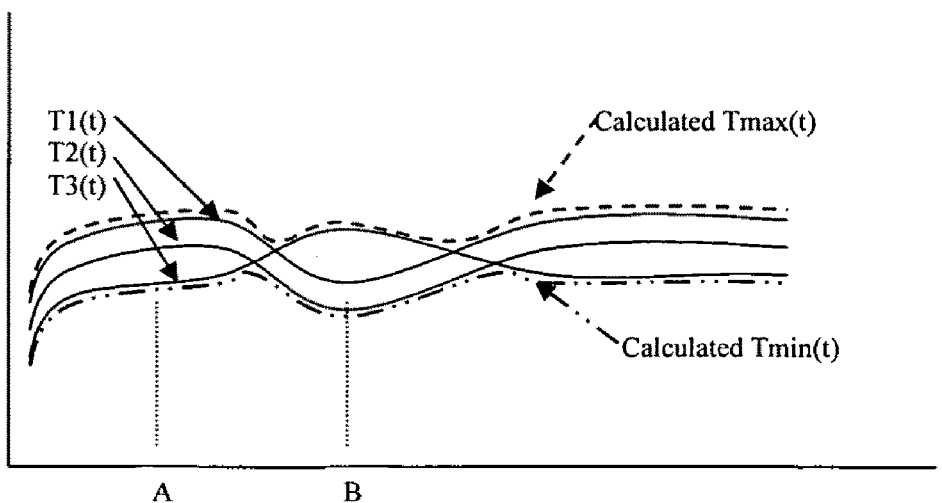

One embodiment of the present invention for controlling the operating temperature of a reactor using a closed-loop system is graphically depicted in FIGS. 2 and 3. FIG. 2 illustrates reactor operating temperature measurements made at three locations in a reactor T1, T2, and T3, each at time t, designated by T1(t), T2(t), and T3(t), respectively. At each time t, the highest temperature is denoted as Tmax(t), and similarly the minimum temperature at time t is Tmin(t). In the example depicted in FIG. 2, two points in time along the x-axis are designated as t=A and t=B as shown. At time t=A, the highest temperature is T1(A), therefore Tmax(A) (i.e., Tmax at time A) is equal to T1(A). At time B, however, T3 is the highest temperature, consequently Tmax(B) is equal to T3(B). In this manner, the function Tmax(t) and Tmin(t) is calculated by the control system, as shown in FIG. 3, for use in the algorithm described below.

An initial steady state temperature setpoint (hereinafter referred to as "Th") is selected to deliver safe durable reactor operation. A short term allowable temperature setpoint (hereinafter referred to as "Th-max") is selected to deliver safe operation with limited reactor life. The controller adjusts reactor parameters in order to maintain Tmax(t) at or near Th. Th may be held constant, as in the case of a simple temperature controller, wherein the reactor is held to a constant maximum temperature having advantages well known in the art.

In the case of a CPOx reactor there are additional benefits associated with the closed-loop system control. Typically, the CPOx reactor is operating at the edge of its material limits. Coking and small changes in fuel or air flows can cause large changes in temperature. Accordingly, the control system of the present invention is particularly relevant and beneficial to CPOx of liquid fuels However, even if Tmax(t) is held constant, there may be conditions or properties particular to the reactor which cause Tmin(t) to vary in undesirable ways; particularly to decrease making the resultant temperature differential Tmax(t)−Tmin(t) to increase. The method of the present invention seeks to reduce the temperature differential Tmax(t)−Tmin(t) by temporarily increasing Th to Th-max, or by alternative control methods considered within the scope of the present invention which increase Tmax(t) while staying below Th-max.

One such alternative control method comprises increasing Th to Th-max for all times where temperature differential Tmax(t)−Tmin(t) exceeds a specified threshold; or, in other words, increasing Th to Th-max until temperature differential Tmax(t)−Tmin(t) is less than a selected threshold. The controller seeks to maintain Tmax(t) equal to Th-max for this duration. Another alternative method comprises increasing Th to Th-max until Tmin(t) is greater than a selected threshold.

The control method applied may take many forms to achieve the same result. Three non-exhaustive set of possible algorithms for a reactor with feed comprising fuel and air only is presented below Such algorithms may be equally applied to a reactor which is also fed with water or steam in which case additional control algorithms that vary the steam flow in desirable ways are possible.

Coupled Approaches:
1. Fixed Air Flow, vary Fuel Flow over range;
2. Fixed Fuel Flow, vary Air Flow over range; and
3. Alternate between 1 and 2 above at period t interval and frequency f maintaining a constant control setpoint.

Decoupled Approach: (i) control Tmax with fuel flow, over a span, for majority of time in closed loop; (ii) periodically, when Tmin=T1, switch to closed loop control with air to control Tmax while fuel loop is open loop with constraint such that Tmax does not exceed Th-max for period of time, t; and (iii) after period of time t, return to closed loop on fuel, and open loop on air.

Hybrid on Tmin rate of decline: If the rate of decline of Tmin, R, is equal to R1, where is R1 is small, then implement the Decoupled Approach provided above; if rate of decline of Tmin is moderate to large, then implement Coupled Approach 3.

Although the invention has been described in considerable detail, it will be apparent that the invention is capable of numerous modifications and variations, apparent to those skilled in the art, without departing from the spirit and scope of the invention.

The invention claimed is:

1. A method for controlling the operating temperature of a reactor in a catalytic partial oxidation process, the method comprising:
   a) feeding a mixture comprising a flow of air and a flow of a liquid distillate fuel through a spray nozzle into the reactor and reacting said mixture in a catalytic partial oxidation process to convert said mixture into a product mixture comprising hydrogen and carbon monoxide, wherein the reactor comprises a wire mesh substrate coated with rhodium supported on an alumina washcoat;
   b) maintaining a maximum observed operating temperature within the reactor at a temperature of less than 1100° C.;
   c) maintaining a minimum observed operating temperature within the reactor at a temperature greater than the threshold temperature for coking;
   d) varying the flow or air, or varying the flow of liquid distillate fuel, or alternately varying the flow of air and the flow of liquid distillate fuel so as to maintain in the mixture fed to the reactor a ratio of oxygen atoms in the air to carbon atoms in the fuel within a range of 1.0-1.2 while maintaining a temperature differential between the maximum observed operating temperature and the minimum observed operating temperature of less than 350° C.

2. The method of claim 1 where the maximum observed operating temperature is less than about 1050° C.

3. The method of claim 1 where the maximum observed operating temperature is between about 980° C. and about 1020° C.

4. The method of claim 3 where the minimum observed operating temperature is greater than about 700° C.

5. The method of claim 3 where the minimum observed operating temperature is greater than about 850° C.

6. The method of claim 1 wherein the temperature differential between the maximum observed operating temperature and the minimum observed operating temperature is less than 150° C.

7. An apparatus for controlling the operating temperature of a catalytic partial oxidation reactor comprising
   a) a catalytic partial oxidation reactor for converting a mixture comprising a flow of air and a flow of a liquid distillate fuel into a product mixture comprising hydrogen and carbon monoxide, the catalytic partial oxidation reactor comprising a wire mesh substrate coated with rhodium supported on an alumina washcoat;
   b) a means for maintaining a maximum observed operating temperature within the reactor of less than 1,100° C.;
   c) a means for maintaining a minimum observed operating temperature within the reactor at a temperature greater than the threshold temperature for coking;
   d) a spray nozzle for feeding the mixture comprising the flow of air and the flow of liquid distillate fuel into the reactor;
   e) a means for maintaining in the mixture fed to the reactor a ratio of oxygen atoms in the air to carbon atoms in the fuel within a range of 1.0-1.2 while maintaining a differential between the maximum observed operating temperature and the minimum observed operating temperature of less than 350° C.

8. The apparatus of claim 7 where the maximum observed operating temperature is less than about 1050° C.

9. The apparatus of claim 7 where the maximum observed operating temperature is between about 980° C. and about 1020° C.

10. The apparatus of claim 9 where the minimum observed operating temperature is greater than about 700° C.

11. The apparatus of claim 9 where the minimum observed operating temperature is greater than about 850° C.

12. The apparatus of claim 7 wherein the temperature differential between the maximum observed operating temperature and the minimum observed operating temperature is less than 150° C.

* * * * *

UNITED STATES PATENT AND TRADEMARK OFFICE
CERTIFICATE OF CORRECTION

PATENT NO. : 8,337,757 B2
APPLICATION NO. : 12/322970
DATED : December 25, 2012
INVENTOR(S) : Subir Roychoudhury et al.

Page 1 of 1

It is certified that error appears in the above-identified patent and that said Letters Patent is hereby corrected as shown below:

In the Claims

Column 5, line 47, in Claim 1, first line of part (d), the phrase "varying the flow or air..." should read ----varying the flow of air----

Signed and Sealed this
Tenth Day of March, 2015

Michelle K. Lee
*Deputy Director of the United States Patent and Trademark Office*